(12) United States Patent
Fiske (10) Patent No.: US 8,077,933 B1
(45) Date of Patent: Dec. 13, 2011

(54) MATCHING PRINTS WITH FEATURE COLLECTIONS

(75) Inventor: Michael Stephen Fiske, San Francisco, CA (US)

(73) Assignee: Fiske Software, LLC, San Francisco, CA (US)

( * ) Notice: Subject to any disclaimer, the term of this patent is extended or adjusted under 35 U.S.C. 154(b) by 1042 days.

(21) Appl. No.: 11/897,836

(22) Filed: Sep. 1, 2007

Related U.S. Application Data (60) Provisional application No. 60/842,454, filed on Sep. 6, 2006.

(51) Int. Cl.
*G06K 9/00* (2006.01)
*G06K 9/62* (2006.01)

(52) U.S. Cl. ....... 382/124; 382/125; 382/209; 340/5.82; 340/5.83; 902/3

(58) Field of Classification Search .................. 382/115, 382/124, 125, 126, 127, 209; 340/5.82, 5.83; 902/3
See application file for complete search history.

(56) References Cited

U.S. PATENT DOCUMENTS

| | | | | | |
|---|---|---|---|---|---|
| 5,920,642 | A | * | 7/1999 | Merjanian | 382/126 |
| 6,002,785 | A | * | 12/1999 | Ucida | 382/124 |
| 6,100,811 | A | * | 8/2000 | Hsu et al. | 340/5.83 |
| 6,775,398 | B1 | * | 8/2004 | Schaeck et al. | 382/124 |
| 7,039,223 | B2 | * | 5/2006 | Wong | 382/124 |
| 7,142,091 | B2 | * | 11/2006 | Lane | 340/5.83 |
| 7,142,699 | B2 | * | 11/2006 | Reisman et al. | 382/124 |
| 7,200,753 | B1 | * | 4/2007 | Shinzaki et al. | 713/182 |
| 7,260,246 | B2 | * | 8/2007 | Fujii | 382/124 |
| 7,313,256 | B2 | * | 12/2007 | Lo | 382/124 |
| 7,349,559 | B2 | * | 3/2008 | Miyasaka | 382/124 |
| 7,565,548 | B2 | * | 7/2009 | Fiske et al. | 713/186 |
| 7,702,911 | B2 | * | 4/2010 | Fiske | 713/182 |
| 2002/0035542 | A1 | * | 3/2002 | Tumey et al. | 705/44 |
| 2002/0174346 | A1 | * | 11/2002 | Ting | 713/186 |
| 2002/0174347 | A1 | * | 11/2002 | Ting | 713/186 |
| 2003/0169910 | A1 | * | 9/2003 | Reisman et al. | 382/124 |
| 2004/0184642 | A1 | * | 9/2004 | Miyasaka | 382/124 |
| 2005/0058325 | A1 | * | 3/2005 | Udupa et al. | 382/125 |
| 2006/0056695 | A1 | * | 3/2006 | Wu et al. | 382/173 |
| 2007/0286465 | A1 | * | 12/2007 | Takahashi et al. | 382/125 |
| 2008/0055247 | A1 | * | 3/2008 | Boillot | 345/158 |
| 2010/0046755 | A1 | * | 2/2010 | Fiske | 380/256 |
| 2010/0266168 | A1 | * | 10/2010 | Wang et al. | 382/124 |

* cited by examiner

*Primary Examiner* — Bhavesh Mehta
*Assistant Examiner* — Mia M Thomas
(74) *Attorney, Agent, or Firm* — David Lewis (57) ABSTRACT

In one embodiment, biometric authentication, using fingerprints, handprints, retinal scans and voice recognition, may be used as a means of granting access to an individual, for example, to use a device or gain entry to a building, car, computer, airport, website, a bank account, execute a financial transaction, access a military installation, read or obtain confidential information, execute a legal agreement, authenticate a decision, or another entity. In another embodiment, biometric authentication can be used as an alternative to the use of a key or combination or as an additional form of authentication. Access may be in any of a number of forms. In one embodiment a collection of pairs of features from one biometric print is compared to another collection of pairs from another biometric print to determine whether biometric authentication is successful.

43 Claims, 5 Drawing Sheets

Figure 5 transformation from the top region to the bottom region is a translation of (-83, -764) and a rotation of 30 degrees

MATCHING PRINTS WITH FEATURE COLLECTIONS

RELATED APPLICATIONS

This application claims priority benefit of U.S. Provisional Patent Application Ser. No. 60/842,454, entitled "Measuring Biometric Similarity with Features," filed Sep. 6, 2006, which is incorporated herein by reference.

FIELD

The specification generally relates to biometrics, security and personalization.

BRIEF DESCRIPTION OF THE FIGURES

In the following figures, although they may depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Biometric authentication, using fingerprints, handprints, retinal scans and voice recognition, may be used as a means of granting access to an individual, for example, to use a device or gain entry to a building, car, computer, airport, website, a bank account, execute a financial transaction, access a military installation, read or obtain confidential information, execute a legal agreement, authenticate a decision, or another entity. Biometric authentication can be used as an alternative to the use of a key or combination or as an additional form of authentication. Access may be in any of a number of forms. For example, access may be in a physical form, such as permitting the user to open a door, or it may be electronic in nature, such as granting access to a PC, an online database, or executing a financial transaction or legal agreement.

Biometric authentication may also be used for personalization. In one embodiment, after authentication the appropriate user's preferences may be retrieved or presented to the user. For example, after authentication, a VCR remote may display on the television or screen the types of movies or television shows that this user prefers. As another example, after authentication, a website could provide a user's favorite kinds of music or songs.

In an embodiment, in order to grant access to an individual or provide user preferences, the device or system should have the fingerprint (or fingerprint derivative) stored in a way that makes possible a comparison between a stored template and the individual's finger (e.g., any representation of the fingerprint). The fingerprint may be obtained by any of a number of ways. In an embodiment, in order for the fingerprint to be stored, the individual either enrolls through the use of a fingerprint sensor, or by having a traditional ink-and-paper fingerprint scanned digitally into the system. This application pertains to the matching of features from two or more biometric records regardless of how they are acquired.

Using a fingerprint sensor, an individual places his/her finger onto a fingerprint sensor pad, or in the case of a "sweep" type sensor, swipes his/her finger over the fingerprint sensor in order for the device to acquire his/her fingerprint. After the image is obtained, in some fingerprint applications, a features extraction algorithm is used to locate features on the image. After the extraction is finished, the features from one fingerprint are matched with features from one or more fingerprints that were obtained during setup— also called enrollment. If the features match well, then the user is allowed access. In some embodiments, the quality of the match is determined by a match score. If the features do not match well, then the user is denied access. This process of allowing or denying access is called authentication.

During authentication, the frequency with which an enrolled and valid user's fingerprint is rejected as a match is known as the False Reject Rate (FRR); the frequency with which an imposter's fingerprint is erroneously accepted as a match is known as the False Acceptance Rate (FAR). In an embodiment, during authentication, a common goal of a feature matching method is to reduce the FRR and also to reduce the FAR.

In an embodiment, a feature matching method may also be used for obtaining fingerprints during setup. In some cases, the feature matching method may not only help to improve the average quality of the originally enrolled fingerprint images, but may also serve to reduce an individual's FRR during authentication. The feature matching method may use any of a number of techniques to ensure that a good quality image has been captured by the sensor. In one embodiment, two distinct fingerprint images obtained during setup can be considered of good quality if their matching score is above a certain threshold. A sufficiently high matching score qualifies these fingerprints as valid setup images for the purpose of matching a fingerprint sensed at a later time when requesting access. (A description of features is given below.) Two fingerprint images obtained during setup which do not have a sufficiently high matching score may be discarded. In an embodiment, a fingerprint obtained during setup with at least a minimum number of features that match corresponding features from a distinct fingerprint obtained during setup, may be considered of good quality and subsequently stored. Subsequently, this stored fingerprint information is used for comparison against a fingerprint obtained during authentication.

Figure 1:
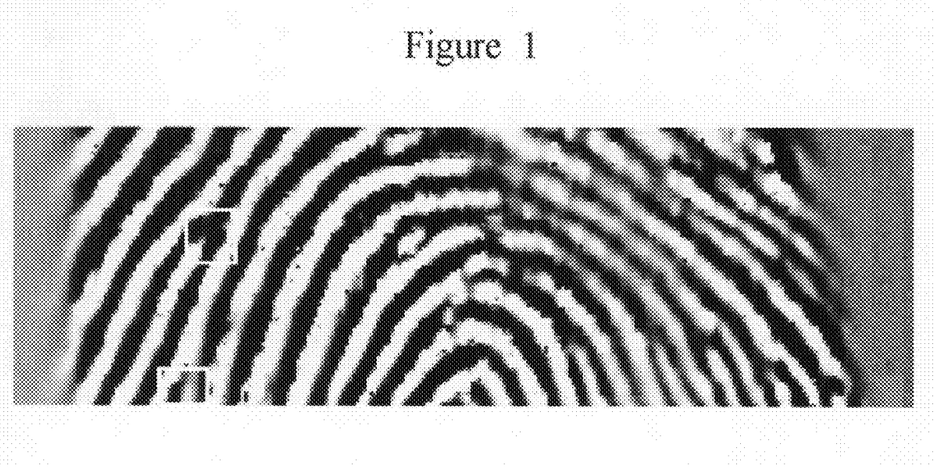
FIG. 1 shows a portion of a fingerprint with two white rectangles, marking features.
Figure 2:
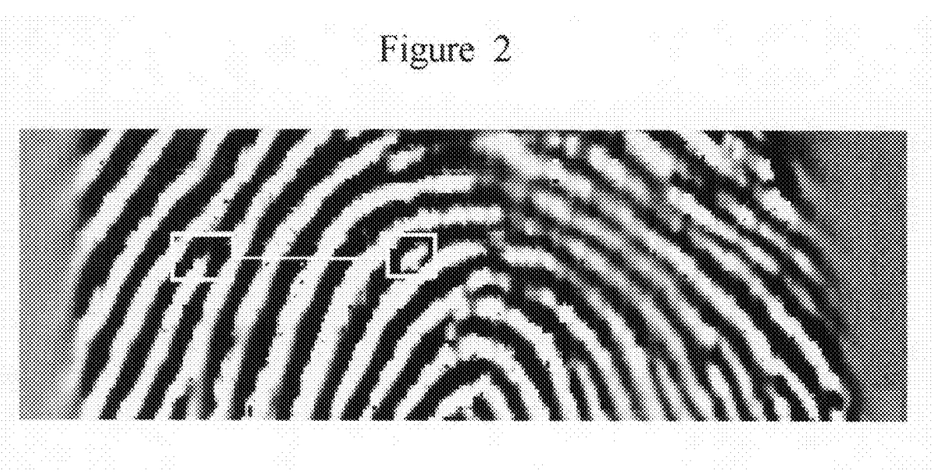
FIG. 2 shows a portion of a fingerprint with two white rectangles, marking features, and a white line connecting the white rectangles to aid in ridge and valley counting.
Figure 3:
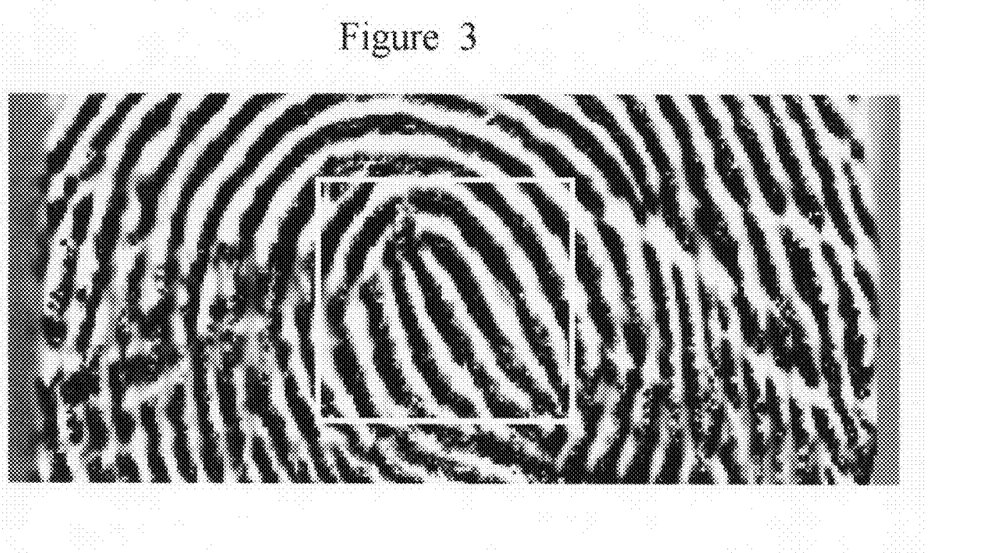
FIG. 3 shows a portion of a fingerprint with a white rectangle, marking a core feature of a fingerprint.
Figure 4:
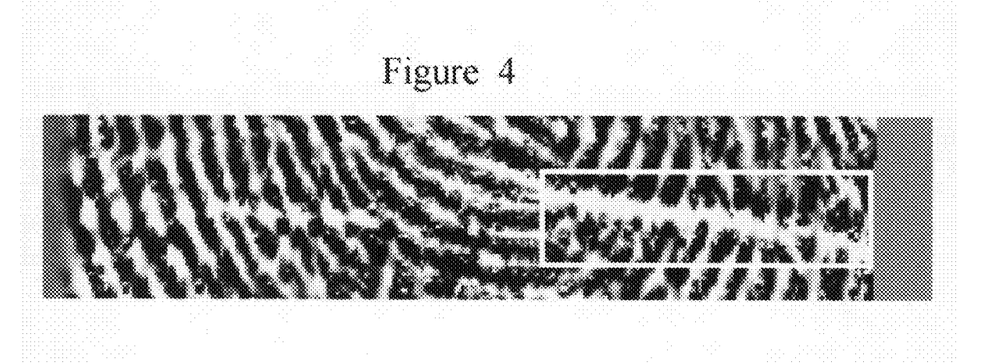
FIG. 4 shows a portion of a fingerprint with a white rectangle, marking a cut feature.

The word "feature" may be used to denote a valley ending or a valley bifurcation. The white rectangle at the bottom and left part of FIG. 1 surrounds a valley ending and the white box above it and slightly to the right surrounds a valley bifurcation. We also use the word "feature" to denote any noteworthy structure in the fingerprint. A feature may be a sweat pore. A feature may be the number of valleys between two other features. In FIG. 2, there are three valleys between the valley bifurcation feature and a sweat pore feature. These features are surrounded by white rectangles and connected by a white horizontal line segment. A feature may be more abstract such as the average curvature of the fingerprint in a local region of the fingerprint. A feature may be the core of the fingerprint. In FIG. 3, a white rectangle surrounds the core. A feature may be a valley that is within a certain distance or number of valleys from the core of the fingerprint. A feature may be a cut across the fingerprint. In FIG. 4, a white rectangle surrounds a cut feature.

A feature may also be a cross-foliation of a fingerprint. A cross-foliation may represented by a starting pixel point, (x, y, θ)=(120, 58, 90°) with orientation and a finite sequence such as [−1, −1, −1, 1, 1, 1, 1, 1, 1, −1, −1, −1, −1, 1, 1, 1, 1, 1, 1]. The number 120 is the x-coordinate of the first pixel and the number 58 represents the y-coordinate. The last coordinate, 90°, indicates the direction of the cross-foliation. In the standard trigonometry of the unit circle, 90°, points up along the y-axis. Consequently, pixel (120, 58) is labeled with −1, pixel (120, 57) is labeled with −1, pixel (120, 56) is labeled with −1, pixel (120, 55) is labeled with 1, pixel (120, 54) is labeled with 1, and so on. (To avoid confusion, observe that in bitmap coordinate systems, the y-coordinates sometimes decrease as you move up along the y-axis. This is the opposite of what is taught in high school Algebra.) Each −1 indicates that the corresponding pixel is in a fingerprint valley and each 1 indicates that the corresponding pixel is on a fingerprint ridge. The length of a finite sequence may range from 10 pixels to greater than 200 pixels, depending on parameters such as the resolution of the sensor, the resolution of the pre-processing of enhanced image, speed of the processor, and so on.

In addition, a feature may be a crossover, which is a structure on the fingerprint where two valleys cross each other. A feature can also be a loop, which is a valley that curves at least as much as a horseshoe shape. The loop can even be a complete loop and curve as much as a circle. A loop is usually near the core of the fingerprint. A complex feature is two or more features or simple features composed together. In addition to simple features, complex features can also be matched between two fingerprints.

In regard to notation, the x and y coordinates of a feature p are denoted as $p(x)$ and $p(y)$ and the orientation of a feature is denoted as $p(\theta)$. When a subscript is used for the feature, then we use $p_1(\theta)$. The distance between two features is denoted as $D(p_1, p_2)$.

Figure 5:
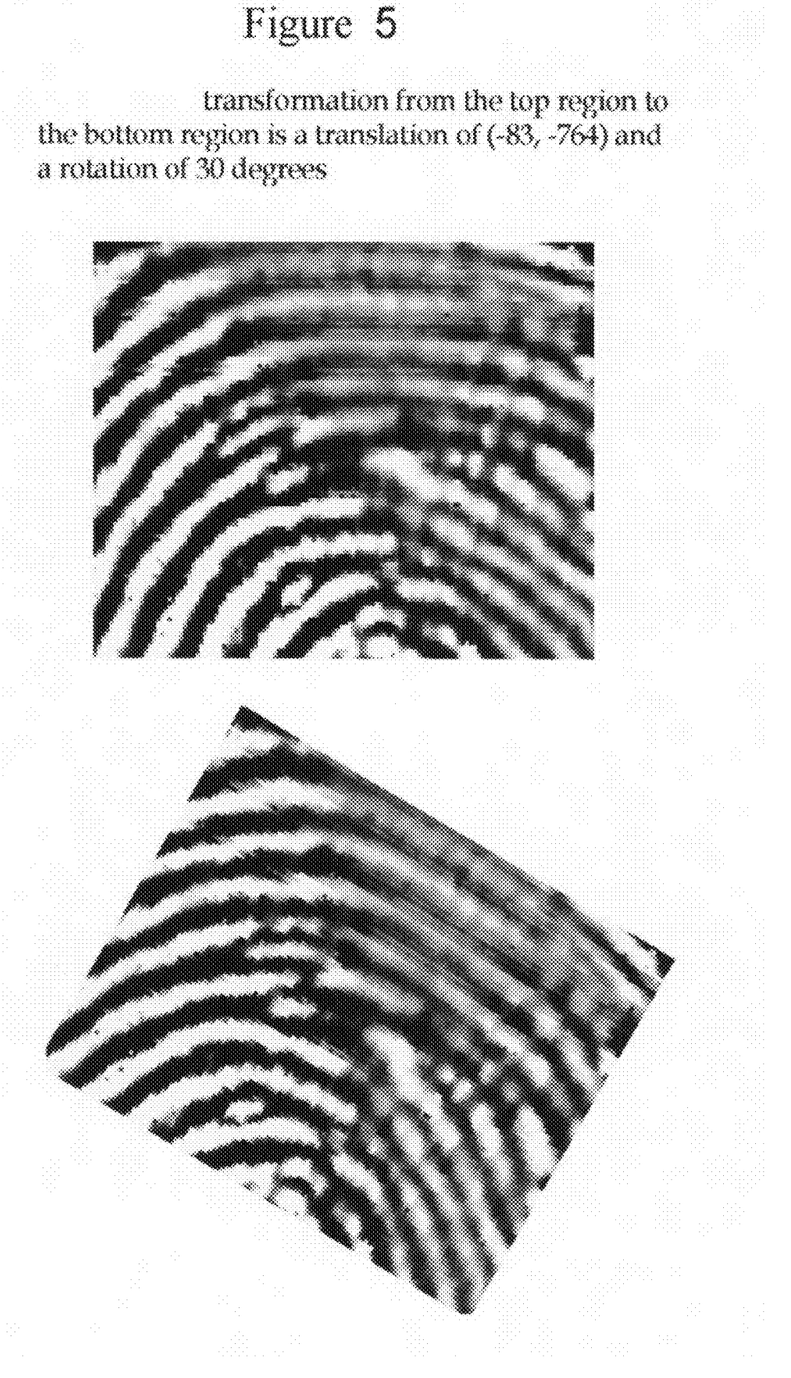
FIG. 5 shows two portions of the same fingerprint image, whereby the transformation from the top portion to the bottom portion is a (−83, −764) translation and a rotation of 30 degrees. Sometimes this transformation may be called an affine transformation or more specifically a locally affine transformation since the affine transformation maps only a portion of the fingerprint image to another location (translation) and orientation (rotation).

In regard to matching collections of features on a print, the goal is to find a transformation that best matches corresponding features between two different fingerprints. A locally affine transformation is a rotation by θ, followed by (function composition) a translation by the vector (a, b). A locally affine transformation from a region of fingerprint A to a region of fingerprint B is shown in FIG. 5. In FIG. 5, the locally affine transformation from the top region of the fingerprint to the bottom region of the fingerprint is (a, b)=(−83, −764) and the rotation θ=30 degrees.

A translation is a function of the form: $T_{(a,b)}(x,y)=(x+a, y+b)$.

A rotation is a function: $R_\theta(x,y)=(x \cos\theta - y \sin\theta, x \sin\theta + y \cos\theta)$.

A locally affine transformation in the plane is the composition of the two:

$$T_{(a,b)}R_\theta(x,y)=(a+x\cos\theta-y\sin\theta, b+x\sin\theta+y\cos\theta).$$

Consequently, a locally affine transformation F may be represented by the three parameters (a, b, θ) and a region A.

An affine transformation may be computed starting with one subset of features $\{p_1, p_2, p_3, \ldots, p_s\}$ selected from a fingerprint and comparing them to another subset of features $\{q_1, q_2, q_3, \ldots, q_s\}$ selected from a distinct fingerprint. In some embodiments, s is two, but s may be larger.

Below are some examples with s=2. The parameters of the transformation F are computed so that $F(p_1)=q_1$ and $F(p_2)=q_2$ Solving for F=(a, b, θ):

$$p_1 = (0, 0), p_2 = (0, 1), q_1 = (3, 2), q_2 = (2, 2). \quad \text{Example 1}$$

$$\Theta_p = arctangent(p_2(x) - p_1(x), p_2(y) - p_1(y)) =$$
$$arctangent(0, 1) = 90°.$$

$$\Theta_q = arctangent(q_2(x) - q_1(x), q_2(y) - q_1(y)) =$$
$$arctangent(0, -1) = 180°.$$

$$\Theta = \Theta_q - \Theta_p = 90 \text{ degrees.}$$

In example 1,
$$Re(p_1) = (0, 0) \text{ and } Re(p_2) = (-1, 0).$$

The average translation is : $(a, b) =$
$$(q_1 - Re(p_1) + q_2 - Re(p_2))/2. \text{ Then } (a, b) =$$
$$0.5 * [(q_1(x) - Re(p_1(x)), q_1(y) - Re(p_1(y)) +$$
$$(q_2(x) - Re(p_2(x)), q_2(y) - Re(p_2(y)))] =$$
$$0.5 * [(3, 2) + (3, 2)] = (3, 2).$$

$$p_1 = (0, 0), p_2 = (3, 4), q_1 = (-1, 4), q_2 = (-6, 4). \quad \text{Example 2}$$

$$\Theta_p = arctangent(p_2(x) - p_1(x), p_2(y) - p_1(y))$$
$$= arctangent(3, 4)$$
$$= 53.13°.$$

$$\Theta_q = arctangent(q_2(x) - q_1(x), q_2(y) - q_1(y))$$
$$= arctangent(-5, 0)$$
$$= 180°.$$
$$\Theta = \Theta_q - \Theta_p = (180° - 53.13°) = 126.87°.$$

In example 2, $R_\Theta(p_1) = (0, 0)$ and $R_\Theta(p_2) = (-5, 0)$.

The average translation is $(a, b) = (q_1 - Re(p_1) + q_2 - Re(p_2))/2.$
$$= 0.5 * [(q_1(x) - Re(p_1(x)), q_1(y) -$$
$$Re(p_1(y)) + (q_2(x) - Re(p_2(x)),$$
$$q_2(y) - Re(p_2(y)))]$$
$$= 0.5 * [(-1, 4) + (-1, 4)]$$
$$= (-1, 4).$$

$$p_1 = (0, 0), p_2 = (-3, -2), q_1 = (1, 2), q_2 = (3, 5). \quad \text{Example 3}$$

$$\Theta_p = arctangent(p_2(x) - p_1(x), p_2(y) - p_1(y)) =$$
$$arctangent(-3, -2) = 213.69°$$

$$\Theta_q = arctangent(q_2(x) - q_1(x), q_2(y) - q_1(y)) =$$
$$arctangent(2, 3) = 56.31°$$

$$\Theta = \Theta_q - \Theta_p = (56.31° - 213.69°) = -157.38° = 202.62°$$

In this example, $Re(p_1) = (0, 0)$ and $Re(p_2) = (2, 3)$

The average translation is $(a, b) =$
$$(q_1 - Re(p_1) + q_2 - Re(p_2))/2.$$

$$(a, b) = 0.5 * [(q_1(x) - Re(p_1(x)), q_1(y) - Re(p_1(y)) + (q_2(x) - Re(p_2(x)), q_2(y) - Re(p_2(y)))]$$
$$= 0.5 * [(1, 2) + (3 - 2, 5 - 3)]$$
$$= (1, 2).$$

The following feature pair conditions aid in feature matching in regard to a transformation between feature pairs.

Angle conditions after solving for $F=(a, b, \theta)$:

1.) The angles match—meaning they are almost the same:

$$|p_i(\theta) + \alpha - q_j(\theta)| < \delta_\theta \text{ and } |p_k(\theta) + \alpha - q_l(\theta)| < \delta_\theta$$

Distance conditions after solving for $F=(a, b, \theta)$:

The distances match—meaning they are almost the same.

2.) $D(F(p_i), q_j) < \delta_1$
3.) $D(F(p_k), q_l) < \delta_2$
4.) $|D(p_i, p_k) - D(q_j, q_l)| < \delta_{12}$ In some embodiments, $\delta_1 = \delta_2$. In some embodiments, $\delta_{12} = 2\delta_1$.

Valley count conditions after solving for $F=(a, b, \theta)$:

The valley counts match—meaning they are the same or almost the same.

5.) $|V(p_i, p_k) - V(q_j, q_l)| < N_V$

The notation $V(p_i, p_k)$ denotes the number of valleys between features $p_i$ and $p_k$. As mentioned before, a fingerprint image has valleys and ridges. For example, in FIG. 2, when the white regions denote valleys, then the number of valleys between the two features surrounded by white rectangles and connected by a white straight line is four (4 valleys). The valley count condition means that that the number of valleys between two corresponding pairs of features should be about the same. In some cases, $N_V$ may not stay constant and may depend on the distance between the features $p_i$ and $p_k$ In what follows is a matching embodiment that searches feature pairs.

Suppose K is the number of affine transformations, F, to store. For a feature pair $(p_i, p_k)$ selected from $\{p_1, p_2, \ldots, p_m\}$
{
  For a feature pair $(q_j, q_l)$ selected from $\{q_1, q_2, \ldots, q_n\}$ and satisfying one or more or all of the angle conditions, distance conditions and valley count conditions (one or more of conditions 1, 2, 3, 4, 5)
  {
    if (feature types of $p_i$ and $q_j$ match well and the feature types of $p_k$ and $q_l$ match well—for example, $p_i$ and $q_j$ are both bifurcations, and the cross-foliation of $p_k$ matches the cross-foliation of $q_l$ above a certain threshold
    )
    {
      compute the affine transformation F such that $F(p_i)=q_j$ and
      $F(p_k)=q_l$ if it has not already been computed
      compute the matching score of F (see details below).
      store F if its matching score is one of the top K scores and remove the transformation with the lowest matching score
    }
    else if (feature types of $p_i$ and $q_j$ match well and the feature types of $p_k$ and $q_j$ match well—for example, $p_i$ and $q_l$ are both core points, and the cross-foliation of $p_k$ matches the cross-foliation of $q_i$ above a certain threshold
    )
    {
      compute the affine transformation F such that $F(p_i) = q_1$ and
      $F(p_k) = q_j$ if it has not already been computed
      compute the matching score of F (see details below).
      store F if its matching score if it is in one of the top K and remove the transformation with the lowest matching score
    }
  }
}

In some embodiments, the valley count condition may not be applied unless the distance condition 4.), stated before, is also satisfied. In other embodiments, the valley count condition may be substituted for the distance count conditions. In other embodiments, the number of ridges may be used instead of valleys. In still other embodiments, both ridges and valleys may be counted. In some embodiments, K ranges from 8 to 30. As described above, the K best transformations are chosen based on their matching scores computed above.

As described before, an affine transformation F is determined by three parameters, $(a, b, \theta)$. Two affine transformations $F=(a_1, b_1, \theta_1)$ and $G=(a_2, b_2, \theta_2)$ are close if the three inequalities hold:

$$|a_1 - a_2| < \delta_a$$

$$|b_1 - b_2| < \delta_b$$

$$|\theta_1 - \theta_2| < \delta_e$$

where $\delta_a$, $\delta_b$, and $\delta_\theta$ are small positive constants. The value of $\delta_a$, $\delta_b$, $\delta_\theta$ may depend on the dimensions of the fingerprint images, and the likelihood that an image could be distorted by a strange placement or sweeping of the finger on the sensor. For some embodiments, $\delta_a$, $\delta_b$, may range from 1 to 6 and $\delta_\theta$ may range from 5 degrees to 40 degrees.

In one embodiment, from these K best affine transformations, the largest number of these affine transformations that are close is chosen. S may be computed by summing these matching scores.

If (S>"match score authentication threshold") accept authentication fingerprint else reject authentication fingerprint As an example, if the number of these affine transformations is five and their respective matching scores are 208, 125, 102, 91 and 234. Then S=208+125+102+91+234=760. If the "match score authentication threshold" is 600, then the fingerprint submitted during authentication is accepted. In an alternative embodiment, the scores may multiplied. The parameter "match score authentication threshold" is chosen based on the requirements of the application and the quality of the data. For example, the "match score authentication threshold" may be larger in a military application versus for a child gaining access to her diary.

Compute matching score of F with respect to $(p_i, p_k)$ and $(q_j, q_l)$:

match_score=0;
while (Still more features to choose from $\{p_1, p_2, \ldots, p_m\}$)
{
    Pick the next feature p from $\{p_1, p_2, \ldots, p_m\}$ so that $p \neq p_i$ and $p \neq p_k$
    r=Apply a transformation to p;
    (r is the approximate location of where feature q may be.)
    q=find features near location r
    if (feature q is found)
    {
        increased match_score based on well feature q and feature p match (*)
    }
}
Return match_score;
(*) One embodiment of this is if match(q, p) match_score+=1;

In regard to searching for nearby features to r, after the affine transformation is applied, the coordinate (r(x), r(y)) is known, but a correspondence between this location and a feature in the set $\{q_1, q_2, \ldots, q_n\}$ may be unknown. The goal is to search for a feature q near (r(x), r(y)).

In regard to increasing the execution speed, particular feature pair may not be stored to reduce the amount of memory or increase the matching speed. One criteria for eliminating pairs is if the distance between two features is less than a minimum distance, called D_INFIMUM. The value of D_INFIMUM may depend on the sensor, and the dimensions of the fingerprint image. For fingerprint images that are 250 pixels by 300 pixels, in some embodiments, D_INFIMUM sometimes ranges from 20 pixels to 100 pixels. Another criteria for eliminating pairs is if the distance between two features is greater than a maximum distance, called D_SUPREMUM. The value of D_SUPREMUM may depend on the sensor, the dimensions of the fingerprint image. For fingerprint images whose dimensions are 250 pixels by 300 pixels, D_SUPREMUM sometimes ranges from 125 pixels to 200 pixels. Another criteria for reducing the number of feature pairs is if the valley count between two features is less than V_INFIMUM or the valley count between two features is greater than V_SUPREMUM.

Another method to increase the execution speed is to use randomness to select feature pairs. In this case, not all of the feature pairs may be searched. This may be useful when execution speed is important, or the processor is slower. In some cases, the processor may be less expensive. In one embodiment, the method randomly selects some of the feature pairs, so that the maximum number of pairs chosen is max_feature_pairs. The value of max_feature_pairs places an upper bound on the amount of computation that is performed. In one embodiment, set Z=max_feature_pairsInitialize a collection of distinct random numbers
$\{r_1, r_2, \ldots, r_Z\}$ such that each $0 \leq r_i <$ max_feature_pairs and $r_i \neq r_k$ when $i \neq k$. In some cases a random number may be used to generate $\{r_1, r_2, \ldots, r_Z\}$ In this alternative, the computation is the same as the computation shown in the matching embodiment that searches feature pairs except the features chosen from $\{p_1, p_2, \ldots, p_m\}$ are selected using the random numbers $\{r_1, r_2, \ldots, r_Z\}$.

When greater accuracy is preferred, each fingerprint may be separated into local regions. In this case, a different locally affine transformation is computed between each pair of corresponding regions in fingerprint A and fingerprint B. In this case, locally affine transformations match corresponding features between two fingerprints, because sometimes fingerprint images suffer from translational and rotational deformations. These deformations are typically caused by the user not properly placing his or her finger on the sensor, or squishing the finger in an unusual manner. In the case of sweep sensors, sweeping the finger at a varying speed across the sensor, or sweeping the finger at an angle can cause deformations in the fingerprint image.

The invention claimed is:

1. A method of measuring how well fingerprints match comprising:
    comparing, by a processor of a machine, a pair of features from a first fingerprint with a pair of features from a second fingerprint, deriving a transformation that transforms the first pair of features of the first fingerprint to more closely match the first pair of features of the second fingerprint, and storing the transformation in a memory of the machine;
    repeating, by the machine, the comparing and the deriving of the transformation for each of a set of pairs of features on the first fingerprint and a set of pairs of features on the second fingerprint, therein forming a set of transformations;
    determining, by the machine, a degree to which each of the transformations of the sets of transformations match one another, and finding a subset of the set of transformations that is the largest group of transformations that match one another within a predetermined tolerance; computing a matching score for each transformation in the subset;
    combining, by the machine, the matching scores of each of the transformations of the subset to form a matching score representing a degree to which the first fingerprint matches the second fingerprint; and
    if the matching score for the fingerprints is above a threshold, indicating, by the machine, that the first and second fingerprint match.

2. The method of claim 1 wherein the one or more pairs of features from the first fingerprint and the one or more pairs of features from the second fingerprint are compared based on the distance between the features of the one or more pairs of features in the first fingerprints and the distance between the features of the one or more pairs of features in the second fingerprint.

3. The method of claim 1 wherein the one or more pairs of features from the first fingerprint and the one or more pairs of features from the second fingerprint are compared based on the number of valleys between the features of the one or more pairs of features in the first fingerprints and the number of valleys between the features of the one or more pairs of features in the second fingerprint.

4. The method of claim 1 wherein a pair of features from the first fingerprint is compared with a pair of features from the second fingerprint, if a transformation rotates a first feature of the pair of features on the first fingerprint by an angle to orient a first feature of the pair of features on the second fingerprint that matches an angle of a transformation that orients a second feature of the pair of features on the first fingerprint to match a second feature of the pair of features on the second finger print.

5. The method of claim 1, further comprising determining whether the one or more pairs of features from the first fingerprint and the one or more pairs of features from the second fingerprint are of a same predetermined type;
    if it is determined that the first pair of features from the first fingerprint and the first pair of features from the second fingerprint are of the same predetermined feature type, performing the comparing.

6. The method of claim 5 wherein the predetermined feature type is an ending of a ridge.

7. The method of claim 5 wherein the predetermined feature type is a bifurcation.

8. The method of claim 5 wherein the predetermined feature type is a cross-correlation.

9. The method of claim 5 wherein the predetermined feature type is complex, including at least two or more features.

10. The method of claim 5 wherein the predetermined type is a loop, the loop includes at least a valley that is a curve at least as much as a horseshoe shape.

11. The method of claim 1 wherein only a predetermined number of transformations matching scores that are higher than matching scores of transformations not in the set are kept in the set.

12. The method of claim 1 wherein the transformations are affine.

13. The method of claim 1 wherein the transformations are applied to features of the first fingerprint to search for nearby features from the second fingerprint and wherein at least a contribution to the matching score of a particular transformation depends on how many features were found on the second fingerprint by the search.

14. The method of claim 1 wherein a successful match is required for access to an entity.

15. The method of claim 14, wherein the entity is a physical place.

16. The method of claim 14, wherein the entity is confidential information.

17. The method of claim 1 wherein a successful match is required to execute an agreement or transaction.

18. The method of claim 1 wherein a successful match provides a personalization.

19. A machine determining how well fingerprints match-comprising: a processor: a memory storing information representing fingerprints, and storing one or more machine readable instructions, which when implemented cause the processor to implement the method including at least: comparing, by the processor, a first pair of features from one a first fingerprint with a first pair of features from a second fingerprint, deriving a transformation that transforms the first pair of features of the first fingerprint to more closely match the first pair of features of the second fingerprint, and storing the transformation in the memory of the machine; repeating, by the machine, the comparing and the deriving of the transformation for each of a randomly selected subset of a larger set of pairs of features on the first fingerprint and a set of pairs of features on the second fingerprint, therein forming a set of transformations; determining, by the machine, a degree to which each of the transformations of the set of transformations match one another, and finding a subset of the sets of transformations that is the largest group of transformations that match one another within a predetermined tolerance; computing a matching score for each transformation in file subset; combining, by the machine, the matching scores of each of the transformations of the subset to form a matching score representing a degree to which the first fingerprint matches the second fingerprint; and if the matching score for the fingerprints is above a threshold, indicating, by the machine, that the first and second fingerprint match.

20. The machine of claim 19 wherein the one or more pairs of features from the first fingerprint and the one or more pairs of features from the second fingerprint are compared based on the distance between the features of the one or more pairs of features in the first fingerprints and the distance between the features of the one or more pairs of features in the second fingerprint.

21. The machine of claim 19 wherein the one or more pairs of features from the first fingerprint and the one or more pairs of features from the second fingerprint are compared based on the number of valleys between the features of the one or more pairs of features in the first fingerprints and the number of valleys between the features of the one or more pairs of features in the second fingerprint.

22. The machine of claim 19 wherein a pair of features from the first fingerprint is compared with a pair of features from the second fingerprint, if a transformation that rotates a first feature of the pair of features on the first fingerprint by an angle to orient a first feature of the pair of features on the second fingerprint that matches an angle of a transformation that orients a second feature of the pair of features on the first fingerprint to match a second feature of the pair of features on the second finger print.

23. The machine of claim 19, further comprising
determining whether the one or more pairs of features from the first fingerprint and the one or more pairs of features from the second fingerprint are of a same predetermined type;
if it is determined that the first pair of features from the first fingerprint and the first pair of features from the second fingerprint are of the same predetermined feature type, performing the comparing.

24. The machine of claim 23 wherein the predetermined feature type is an ending of a ridge.

25. The machine of claim 23 wherein the predetermined feature type is a bifurcation.

26. The machine of claim 23 wherein the predetermined feature type is a cross-correlation.

27. The machine of claim 23 wherein the predetermined feature type is complex, including at least two or more features.

28. The machine of claim 23 wherein the predetermined feature type is a loop, the loop includes at least a valley that is a curve at least as much as a horseshoe shape.

29. The machine of claim 19 wherein only a predetermined number of transformations matching scores that are higher than matching scores of transformations not in the set are kept in the set.

30. The machine of claim 29 wherein the transformation are affine.

31. The machine of claim 29 wherein the transformations are applied to
features of first said fingerprint to search for nearby features from other said fingerprint.

32. The machine of claim 19 wherein a successful match is required for access to an entity.

33. The machine of claim 32, wherein the entity is a physical place.

34. The machine of claim 32, wherein the entity is confidential information.

35. The machine of claim 19 wherein a successful match is required to execute an agreement or transaction.

36. The machine of claim 19 wherein a successful match provides a personalization.

37. A method of claim 19 wherein the cross foliation is represented by at least coordinates indicating a location of a feature,
an angle of orientation of a string of pixels associated with the location of the feature, and
a string of values in which each value represents
whether the pixel is located at a ridge and
whether the pixel is located at a valley.

38. A method of measuring how well fingerprints match comprising:
- for each of a set of pairs of features on a first fingerprint determining a cross foliation of at least one feature of one pair of features on the first fingerprint and a cross foliation of at least one feature of a second pair of features;
- determining whether the cross foliation of the at least one feature of the one pair of features on one fingerprint and the cross foliation of the at least one feature of the second pair of feature match within a tolerance;
- comparing, by a machine having a processor and memory unit, one or more pairs of features from the first fingerprint with one or more pairs of features from the second fingerprint wherein the pairs including a pair of features from the first fingerprint and a pair or features from the second fingerprint, that have been compared, if the one or more pairs of features from the first fingerprint have a cross foliation that matches a cross foliation of a feature of a pair of features on the second fingerprint, the one or more pairs of fingerprints, and compared based on one or more of the following:
  - the distance between the pairs of features on the first finger print;
  - the number of valleys between the pairs of features on the first finger print;
  - angles of features in the first fingerprint and the second fingerprint;
  - predetermined feature types of features in the pairs of features of the first fingerprint;
- the method also includes at least deriving a transformation that matches one pair of features from the first fingerprint with another pair of features from the second fingerprint;
- repeating, by the machine, the comparing and the deriving of the transformation for each of a set of pairs of features on the first fingerprint and a set of pairs of features on the second fingerprint, therein forming a set of transformations;
- determining, by the machine, a degree to which each of the transformations of the set of transformations match one another, and finding a subset of the set of transformations that is the largest group of transformations that match one another within a predetermined tolerance; computing a matching score for each transformation in the subset;
- combining, by the machine, the matching scores of each of the transformations of the subset to form a matching score representing a degree to which the first fingerprint matches the second fingerprint; and
- if the matching score for the fingerprints is above a threshold, indicating, by the machine, that the first and second fingerprint match.

39. The method of claim 38 wherein the transformation derived is applied to features of the first fingerprint to search for nearby features from the second fingerprint.

40. The method of claim 39 wherein the transformations are applied to features of the first fingerprint to search for nearby features from the second fingerprint and wherein at least a contribution to the matching score of a particular transformation depends on how many features were found on the second fingerprint by the search.

41. The method of claim 38 wherein the set of pairs of features includes pairs of features in which each feature of a particular set of the pairs is within a predetermined range of distances of each other.

42. The method of claim 38, wherein the set of pairs of features includes pairs of features in which each feature of a particular set of the pair is within a predetermined range of valley counts.

43. The method of claim 38 wherein the pairs of features of the set of pairs of features are randomly chosen.

* * * * *